United States Patent
Liang et al.

(10) Patent No.: US 10,275,716 B2
(45) Date of Patent: Apr. 30, 2019

(54) FEEDS BY MODELLING SCROLLING BEHAVIOR

(71) Applicant: Microsoft Technology Licensing, LLC, Redmond, WA (US)

(72) Inventors: Guanfeng Liang, Fremont, CA (US); Shaunak Chatterjee, Sunnyvale, CA (US); Romer Rosales, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 620 days.

(21) Appl. No.: 14/814,104

(22) Filed: Jul. 30, 2015

(65) Prior Publication Data
US 2017/0032264 A1  Feb. 2, 2017

(51) Int. Cl.
*G06N 5/02* (2006.01)
*G06N 5/04* (2006.01)
*G06N 99/00* (2019.01)
*G06F 17/30* (2006.01)

(52) U.S. Cl.
CPC .......... *G06N 5/048* (2013.01); *G06F 17/3089* (2013.01); *G06N 99/005* (2013.01); *G06N 5/02* (2013.01)

(58) Field of Classification Search
CPC ....................................................... G06N 5/02
USPC ...................................................... 706/11, 45
See application file for complete search history.

(56) References Cited

PUBLICATIONS

Arnold, Interactive Classification of Keyword Search Queries, Master's Thesis, Mat-Nr. 310221, Technische Universitaet Berlin, Mar. 23, 2015, pp. 1-88.*
Froehlich, Sensing and Feedback of Everyday Activities to Promote Environmental Behaviors, Doctoral Thesis, University of Washington, 2011, pp. 1-408 (Year: 2011).*
Yu et al., "News Feed FYI: Taking Into Account Time Spent on Stories", dated Jun. 12, 2015, https://newsroom.fb.com/news/2015/06/news-feed-fyi-taking-into-account-time-spent-on-stories/, 3 pages.

* cited by examiner

*Primary Examiner* — Wilbert L Starks
(74) *Attorney, Agent, or Firm* — Hickman Palermo Becker Bingham LLP (57) ABSTRACT

A method and apparatus for populating content items into a feed is provided. The feed comprises a sequence of content item ordered in such a way as to maximize a number of content items displayed to a user by virtue of the user scrolling down through the feed. The content items are each associated with a click-through rate, an indication of a number of times the content has been displayed to users, an indication of a number of times that the users have scrolled to a next item in the feed after the item was displayed, and a height of the content item. These values are used to train a behavioral model and then used by the behavioral model to layout the content items in a feed rendered at a user device.

20 Claims, 5 Drawing Sheets

FEEDS BY MODELLING SCROLLING BEHAVIOR

TECHNOLOGY FIELD

The present application relates to computer implemented data processing techniques and, more specifically, to populating content into an online feed.

BACKGROUND

Webpages posted by online publishers have a number of user interface elements that are used to distribute content to visitors of the webpage. One such user interface element is a newsfeed, also referred to as a feed. A feed comprises a seemingly never-ending sequence of content items or links to content items that are selectable by the user.

Online publishers are incented to have users view as many content items in the feed as possible. As such, online publishers populate the feed using a greedy algorithm that places content items having a higher click-through rate (CTR) near the top of the feed. Viewers, however, may navigate away from the feed after only viewing a few content items, meaning that they have viewed fewer content items than the online publishers would like them to have viewed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A feed displayed vertically is described herein. In such a feed, a height of the content item refers to the vertical height of the content item. Further, the distance of the content item from the top of the feed is a vertical distance from the top of the feed. Other embodiments may include a feed displayed horizontally. In horizontally-displayed feeds, the height of the content item refers to the horizontal width of the content item. The distance in a horizontally-displayed feed is a horizontal distance from the start of the feed, typically a rightmost edge of the feed. In some geographic locations or languages, the "top" of the horizontally displayed feed may refer to the leftmost edge of the feed.

General Overview

Online feeds are popular user interface elements because they allow user to scroll through and view content items efficiently without disruptions like reloading the webpage or navigating to a "next" webpage. For the purposes of this disclosure, a successful online feed is one where the user continues to scroll for more content items after viewing the first displayed content items in the feed.

To generate online feeds where users scroll for additional content, a behavioral modelling system is used to optimize the user's viewing of the entire feed rather than just the first few content items. Various characteristics of the content items can be used to place the content items such as click-through rate (CTR), the height (h) of the content item when displayed in the feed, the distance (t) from the top of the webpage to the top of the content item, and the size (s) of the screen on the user device when the item is shown. To quantify the effect of these characteristics, a second metric, a predicted continuous scrolling probability (CSP), is calculated for each content item.

To illustrate, using a screen on a user device that has size s=100 pixels (px) and four content items to be included in a screen:

(A, 100 px, $100)
(B, 30 px, $99)
(C, 30 px, $98)
(D, 30 px, $97)

where the 2nd and 3rd fields are the height and an expected reward of the content item (expressed as dollars) if it is clicked, respectively. The CTR of each content items is 100% or 1 for content items completely shown in the first screen, expressed mathematically as $$t+h<=s;$$

and the CTR of the content item is zero if the content item is only partially shown or not shown on the screen. In a greedy ranking strategy, where display properties are not taken into account, the content items are shown in the decreasing order of expected reward from the top of the feed downwards: A then B then C then D. Since the height of content item A (h_A) is 100 px, which is equal to the size of the screen (s), content item A occupies the screen completely, and items B, C and D are all pushed lower in the feed, below the displayed area. This results in a total revenue of $100.

Using the optimization techniques described herein, the content items are placed in the feed in the following order: B then C then D then A, then items B, C, and D are all shown in the first screen because they are only 30 pixels each and A is partially shown, which corresponds to a total expected reward of $99+$98+$97=$294.

Feeds

Figure 1:
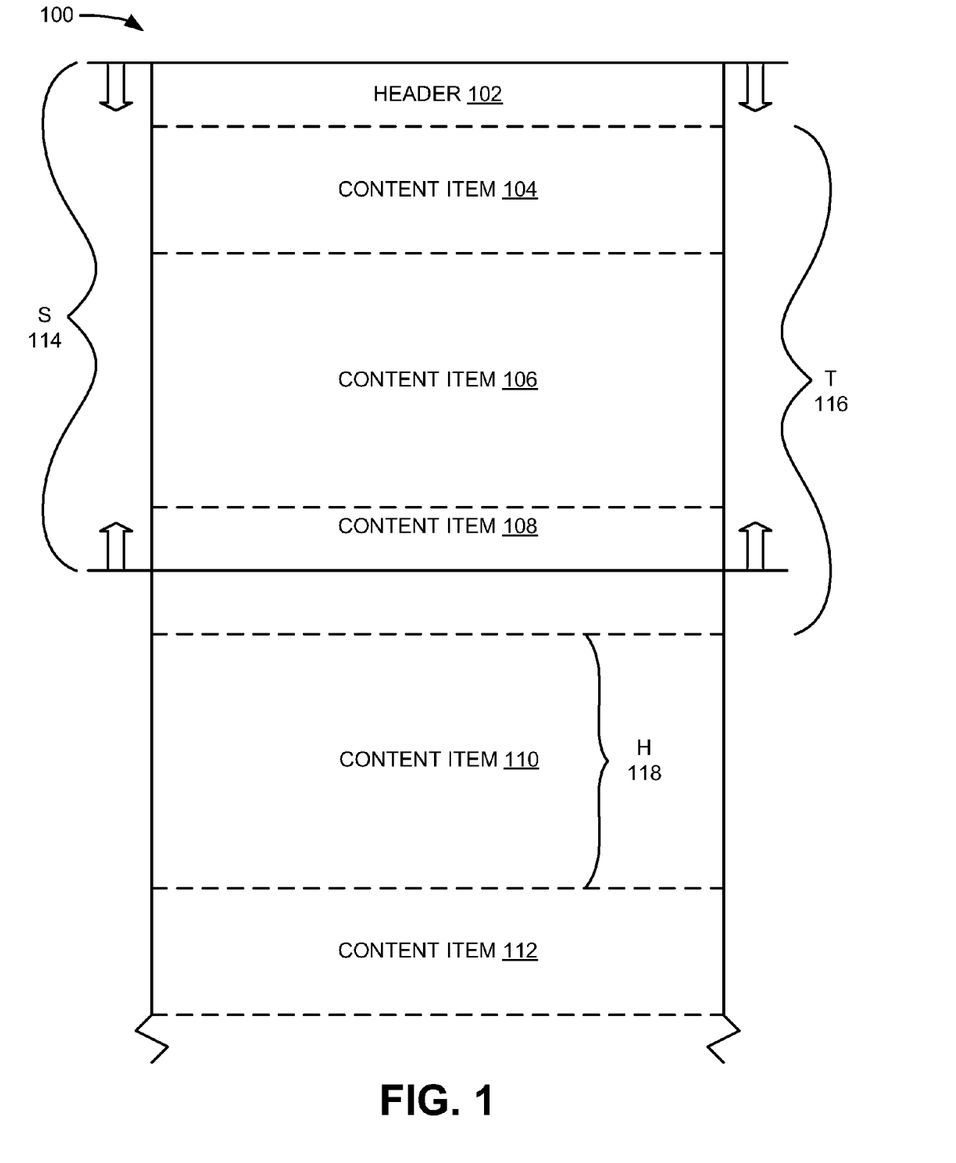
FIG. 1 is an illustration of a feed, according to various embodiments.

FIG. 1 is an illustration of a part of a feed 100, according to various embodiments. The feed 100 is depicted as a vertical feed but may be a horizontal feed in some embodiments. The feed 100 comprises an optional header 102 and content items 104-112. At a given time, only a portion of the feed 100 can be displayed on a screen of a user device (not depicted). The feed 100 may be navigated by the user by scrolling down to view more content items in the feed 100 or scrolling up to view previously viewed content items in the feed 100.

The feed 100 comprises an optional header 102 located at the top of the feed 100. The header 102 is not a content item itself. The header 102 may include a logo of, or otherwise identify, the webpage providing the feed 100 and a menu or link to a menu of options selectable by the user. In some embodiments, the header 102 can include other functionalities such as a search bar or notifications. The header 102 may persist at the top of the screen as the user scrolls down through the feed 100. The header 102 may be hidden from view and be re-presented upon receiving an input from a user, such as an instruction to scroll up or to stop scrolling.

The feed 100 comprises a sequence of content items, such as content items 104-112. The content items 104-112 are presented as an ordered sequence, where the content items are vertically arranged according to an ordering as described herein. The content items can include one or more links to further content items. The position of each of the content items 104-112 is expressed in terms of its vertical size and its distance from the top of the first content item 104 in the feed 100. Other embodiments can express the distance from the top of the header 102. To illustrate, for content item 110, its height, labelled h 118, is measured from the top of the content item 110 to the bottom of the content item 110 and expressed as a number of pixels. The distance of content items 104-108, labelled t 116, is measured from the top of content item 104 to the top of content item 110 and expressed as a number of pixels. The feed 100 may comprise more or fewer content items than those depicted in FIG. 1.

In various embodiments, only a portion of the feed 100 is displayed at a user device at a given time. The displayed portion of the feed is expressed as a screen size, s. The screen size can depend on a number of variables controlled by the client device, such as font size, zoom level, size of the physical display, and whether a mobile website or a desktop website is accessed. While the screen size, s, can vary, for the purposes of the present disclosure, it is assumed to be constant number of pixels during the display of a feed 100. In FIG. 1, the screen size s 114 is depicted as two parallel lines. The screen size is shown at the top of the feed 100. As the user scrolls down the feed, the screen size can be conceptualized as a floating window that encompasses the same number of pixel but includes different content items. Further, the screen size s does not necessarily conform to the sizes of the content items. As such, only portions of content items at the top or bottom of the displayed feed may be shown. For example, content item 108, as depicted, is bisected by the bottom line of s 114. As such, only the portion of content item 108 above the line is displayed at the user device unless the user scrolls down.

Scrolling Behavior System

Figure 2:
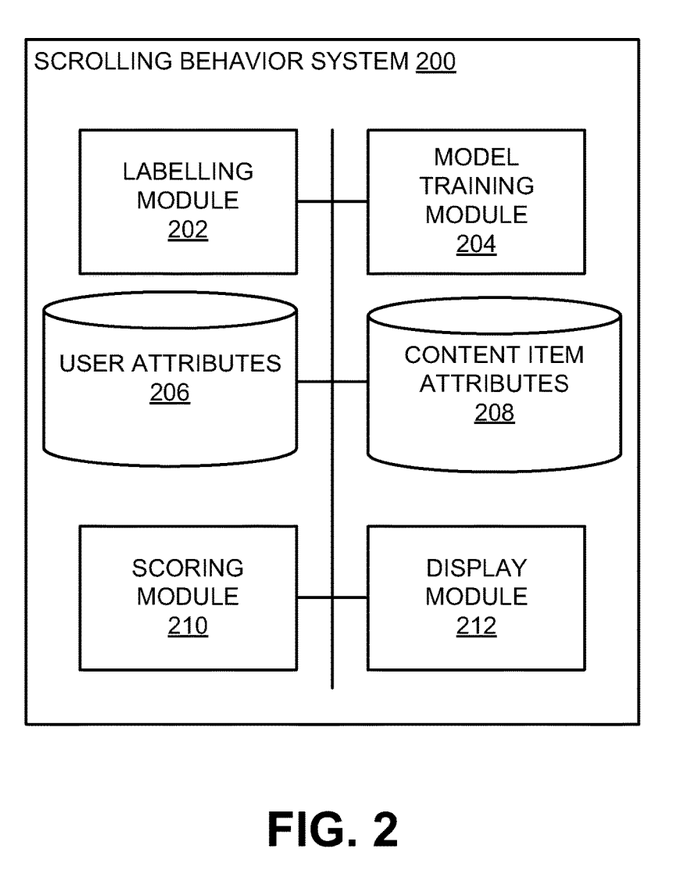
FIG. 2 is a block diagram of a scrolling behavior system, according to various embodiments.

FIG. 2 is a block diagram of a scrolling behavior system 200, according to various embodiments. The scrolling behavior system 200 generates, trains, and implements a behavior model used to order content items in a feed 100. The scrolling behavior system 200 uses the behavior model to sequence content items in feeds rendered to users. The description of the scrolling behavior system 200 describes how modules may be implemented. Upon reading this specification, a person having ordinary skill in the art may use the description herein as pseudo code for implementing the modules.

A labelling model 202 labels content items 104-112 in a feed 100 displayed at a user device. The content items 104-112 may each be labelled "viewed", "clicked", and "scrolled". A content item in the feed 100 is labelled "viewed" when it is completely or partially displayed at the user device. A content item in the feed 100 is labelled "clicked" when it is clicked by the user of the user device. A content item is labelled "scrolled" when a second content item shown below the content item is displayed at the user device. More generally, a content item is labeled scrolled when a certain number n of content items below are displayed. For the purposes of illustration, this description uses a special case where n=1. Thus, a content item can be labelled "viewed" and labelled "scrolled" or just labelled "viewed". The labels assigned to each content item are later used to train a behavioral model.

A model training module 204 trains the behavioral model(s) based on the labelled content items and one or more additional inputs, such as user attributes and content item attributes. Two behavioral models can be trained. The first behavioral model estimates or outputs the probability of a content item being clicked if it is viewed. The second behavioral model estimates or outputs the probability of an item scrolled if it is viewed. The models are trained by various machine learning algorithms with historical data of users' feed visit behavior, and/or other features.

A user attributes database 206 stores one or more attributes of each user who may request a feed 100. The user attributes can be quantified values describing one or more typical behaviors or characteristics of the user. Behaviors of the user may include a number of visits to the webpage over a period of time, a number of logins over a period of time, a number of content items viewed in the feed in one or more previous visits, a number of content items clicked on in the feed in one or more previous visits, and a number of content items scrolled in one or more previous visits. Attributes of the user may include gender, employment status, current employer, job title, a number of connections that the user has in a social network, whether the user has recently changed jobs or positions, membership in one or more affinity groups associated with the webpage, participation in a discussion or activity, the user's locale, an amount of time elapsed since the account was created, age of the user, and when a user's profile was last updated.

A content item attributes database 208 stores one or more attributes in association with one or more content items that can be populated into a feed. The attributes can include, for example, a height h 118 of the content items, a number of times that the content items was viewed or labelled as viewed, a number of times the content item was scrolled or labelled as scrolled, a distance t 116 of the content item from a top of the feed each time the content item was viewed or scrolled. Other attributes that may be used include, but are not limited to, the type of content such as article, photo, document, or advertisement; and the origin of the content such as from another user, from a famous or influential member of the website, or from sponsor of the website.

A scoring module 210, using the behavioral model, scores each of multiple content items that are candidates for inclusion in a particular feed. The set of candidate content items may be identical for each of multiple users or may be determined for each user or for each of multiple user groups, such as female users over 25 years old. The scoring results in a quantitative reward value associated with the content items, their respective placement in the feed, and their respective heights. The scoring is used to order the content items in the feed such that each content item is positioned to optimize the probability of being viewed for all content items in a feed. Because the user views more content items, the user is more likely to click through at least one content item. Over time, the user may prefer the webpage over other webpages and visit the webpage, and the feed, more often.

Training the Behavioral Model

Figure 3:
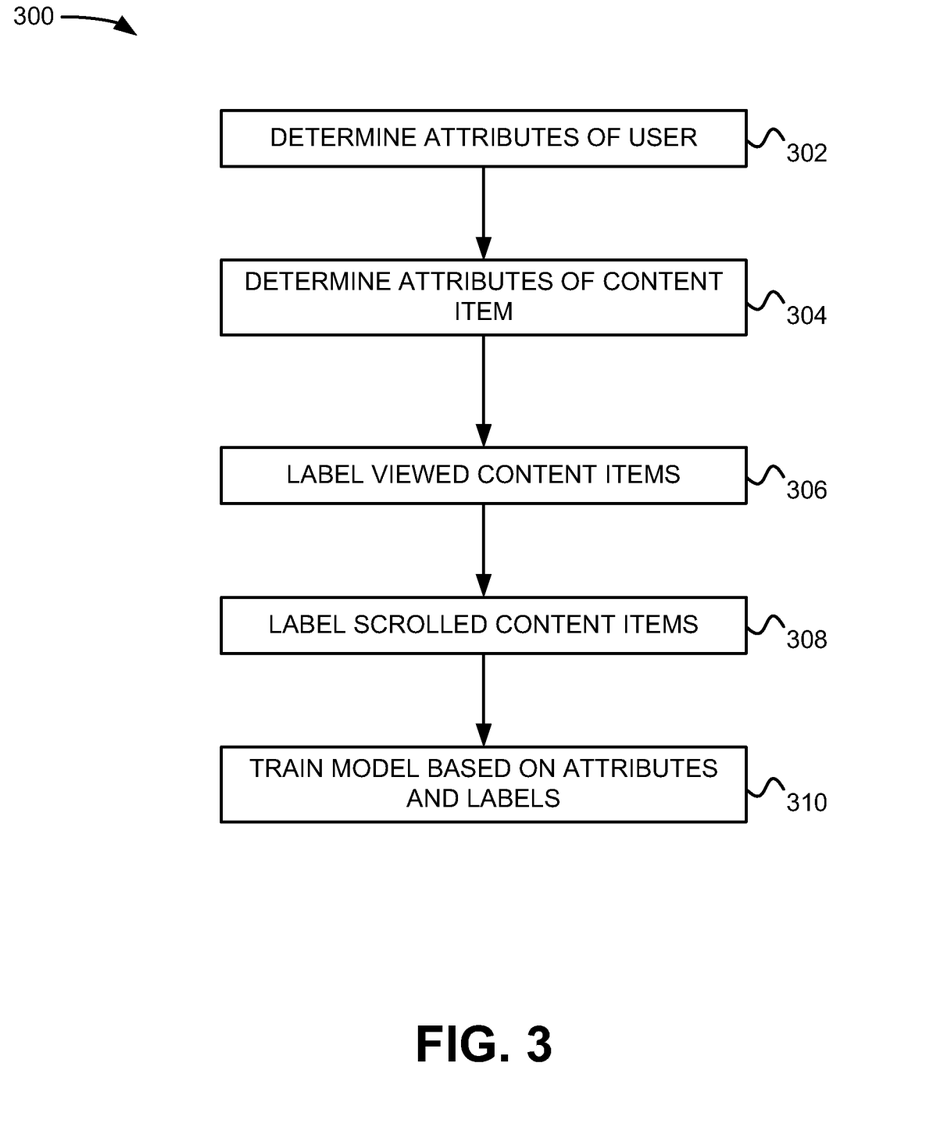
FIG. 3 is a flowchart of a method of generating and training a behavioral model for viewing feeds, according to various embodiments.

FIG. 3 is a flowchart of a method 300 of generating and training a behavioral model for viewing feeds, according to various embodiments. The method 300 can be used to generate a behavioral model from a known set of user characteristics and current scrolling behavior of the users. The method 300 is performed when a previously generated feed 100 is displayed at a user device and includes labelling content items as viewed and scrolled. The method 300 can be performed by the scrolling behavior system 200.

In an operation 302, one or more attributes of a user are determined. In some embodiments, the attributes of the user are retrieved from the user attributes database 206. The user attributes can include information about the past scrolling behavior of the user and past click through behavior of the user. The user attributes can be specific to the user or can be based on a group of users to which the user is assigned or with which the user is affiliated.

In an operation 304, attributes of one or more content items are determined. In some embodiments, the attributes of the content items are retrieved from the user attributes database 208. The attributes can include a height h 118 of the content item, a history of distances t 116 at which the content item has been positioned, and, for each distance t 116, the screen size s 114 of the user device, and whether the content item was clicked. In some embodiments, another attribute of the content item is the width or relative width of the content item in the feed 100 where the width of the content item is measured perpendicular to the height h 118 of the content item.

Some embodiments may include a time spent by a user in viewing the content item in the feed. The time spent by the viewer can be automatically modified based on a length of the content item. The length of the content item can be measured according to the contents of a content item. For a video content item, the length of the content item is based on a playback time of the video. For an image content item (e.g., a cartoon or infographic), the length of the content item is based on a size of the image or a number of words in the image or a number of frames or slides associated with the image. For a text content item (e.g., an article or blog entry), the length of the content item is based on a number of words in the content item.

Various embodiments may include one or more complexity measures to determine the attributes of a content item. The complexity measure can include an average amount of time spent by a particular user viewing a plurality of content items before scrolling. Another complexity measure can include an average time spent viewing a particular content item by a plurality of users who viewed the particular content item. Another complexity measure identifies a number of images or videos included in, or associated with, a particular content item.

In an operation 306, the labelling module 202 labels the content items displayed on the user device as viewed. The content items are displayed depending, in part, on the distance t 116 of the content item relative to the top of the feed 100. A larger screen size means that a greater number of the content items in the feed 100 may be concurrently displayed at the user device while a smaller screen size means that fewer content items may be concurrently displayed at the user device.

In an operation 308, the labelling module 202 labels each content item in the feed 100 as scrolled if one or more subsequent content items after the content item in the feed 100 is displayed at the user device. In other embodiments, the labelling module 202 may label content items in the feed 100 as scrolled if a specified number of content item(s) immediately beneath the respective content item in the feed 100 is displayed at the user device. For example, a content item may be labelled scrolled if a third, fourth, fifth, sixth, seventh, or subsequent content item is displayed. Only content items labelled viewed can also be labelled scrolled. The content items labeled scrolled can be favored by the behavioral model as they are more likely to motivate the user to continue scrolling through a subsequent feed 100 and viewing more content items.

In an operation 310, the behavioral model is trained based the attributes and labels obtained in the method 300. The behavioral model models the probability of events that a content item is seen and/or clicked as a function of (i, u, h, t, s) where i is the content item, u is the user, h is the height of the content item, t is the distance from the top of the feed to the content item, and s is the size of the screen.

First, the behavioral model optionally assumes that the higher (i.e., closer to top of the feed) a content item is placed, the higher the click-through rate (CTR) will be. In other words, given everything the same except for t, CTR is an decreasing function of t:

$$\Pr[\text{seen(or clicked)}|i,u,h,t,s] > \Pr[\text{seen(or clicked)}|i,u,h,t+\Delta,s]$$

This is the fundamental reason behind the intuition of greedy ranking strategies that put items with high score/revenue/reward/utility (high marginal (position oblivious) CTR or high revenue) at higher positions.

Second, the behavioral model optionally assumes that a content item has a higher chance of being displayed at the user device and/or clicked when it is completely shown in the first screen (i.e., the user doesn't scroll down in order to view the content item) than when it is not in the first screen (i.e., the user scrolls down to view the content item) because it requires less effort from the user:

$$\Pr[\text{seen(or clicked)}|t+h<s] \gg \Pr[\text{seen(or clicked)}|t>s]$$

Other assumptions that may be included in the behavioral model are:

1. On every visit, a user only scrolls down the feed 100 and never scrolls up the feed 100.
2. A user always views the content item at position (i−1) before viewing the content item at position i.
3. Pr[item i is clicked|item i is seen]=p_i is constant, independent of Pr[item i is seen] and its position.
4. Pr[scroll to see item i+1|item i is seen and clicked]=0. In various embodiments, this assumption can be changed. This implicitly assumes that there will be at most one click received from the user per visit to the webpage.
~. Pr[scroll to see item i+1|item i is seen and not clicked]=exp^(a*h_i), with a>0. This assumption captures the intuition that the larger an item is in size, the less likely the user will see the next item.

Using the above assumptions, the behavioral model is generated and trained using various modelling techniques. Examples of techniques that can be used include machine learning techniques and statistical techniques, such as logistic regression.

Figure 4:
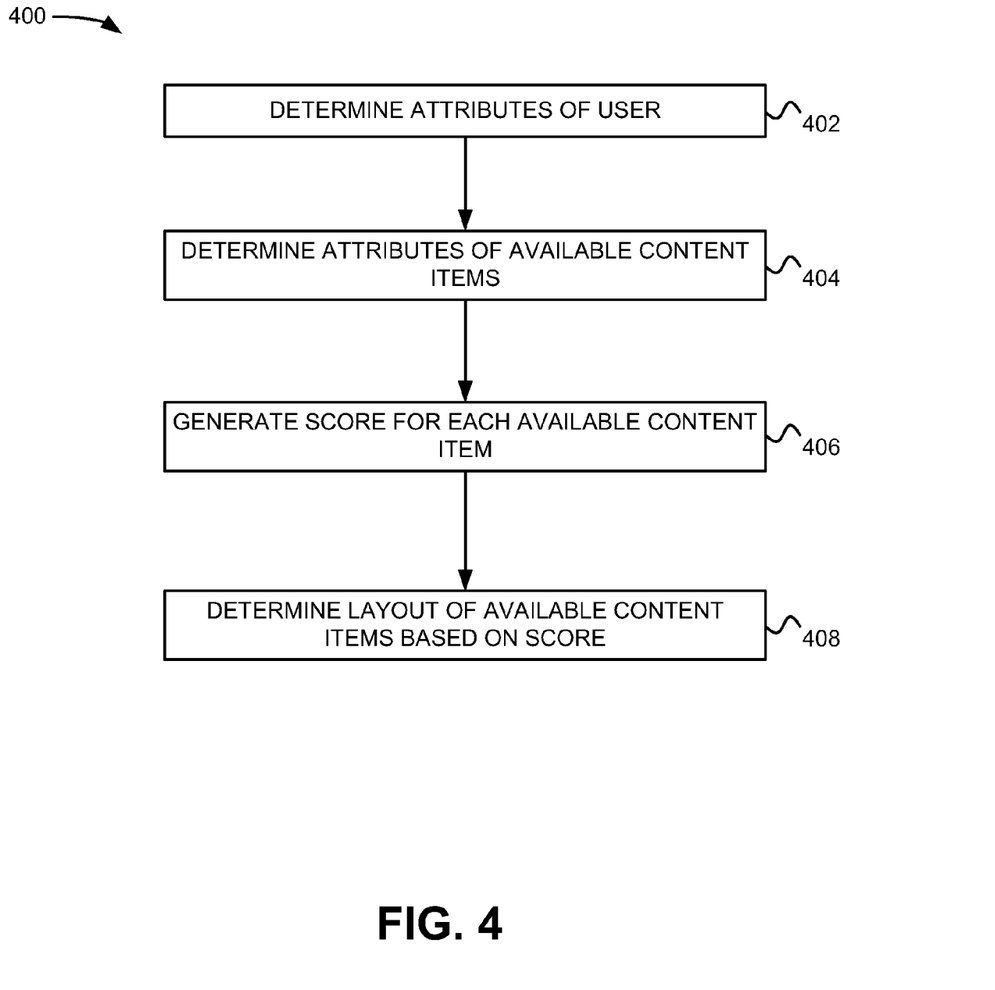
FIG. 4 is a flowchart of a method of populating a feed based on the behavioral model, according to various embodiments.

FIG. 4 is a flowchart of a method 400 of populating a feed 100 based on the behavioral model, according to various embodiments. The feed 100 is populated whenever the feed is rendered for the user. The feed may be rendered each time the user logs in to a particular webpage or each time the user navigates to the particular webpage from another webpage.

In an operation 402, one or more attributes of the user for whom the feed 100 is rendered are determined. In some embodiments, the attributes of the user are retrieved from the user attributes database 206. The user attributes can include information about the past scrolling behavior of the user and past click through behavior of the user. The user attributes can be specific to the user or can be based on a group of users that the user is assigned to or affiliated with.

In an operation 404, attributes of one or more content items available for placement in the feed 100 are determined. In some embodiments, the attributes of the content items are retrieved from the content attributes database 208. The attributes can include a height h 118 of the content item, a history of distances t 116 at which the content item has been positioned, and, for each distance t 116, the screen size s 114 of the user device, and whether the content item was clicked or otherwise selected.

In an operation 406, using the behavioral model of method 300, the scoring module 210 generates a score for each available content item where all of the attributes of the one or more content items are included in the scoring. The behavioral model can score the content items using only the scrolled labels of the operation 308. In other embodiments, the behavioral model can score the content items using the scrolled labels of the operation 308 and the viewed labels of operation 306. In still other embodiments, the behavioral model can score the content items using the scrolled labels of the operation 308, the viewed labels of operation 306, and an established click-through rate associated with the content items.

In one embodiment, for a behavioral model using the scrolled labels of the operation 308, the viewed labels of operation 306, and an established click-through rate associated with the content items, and given the assumptions described in connection with operation 310, the probability the item at position i will be seen is $$Pr[\text{item } i \text{ is seen}] = Pr[\text{item } i\text{-}1 \text{ is seen}] *$$
$$Pr[\text{scroll to see item } i | \text{item } i\text{-}1 \text{ is seen}]$$
$$= Pr[\text{item } i\text{-}1 \text{ is seen}] *$$
$$Pr[\text{item } i\text{-}1 \text{ is not clicked} | \text{item } i\text{-}1 \text{ is seen}] *$$
$$Pr[\text{scroll to see item } i | \text{item } i\text{-}1 \text{ is seen and not clicked}]$$
$$= Pr[\text{item } i\text{-}1 \text{ is seen}](1 - p_{i-1})e^{-ah_{i-1}}$$
$$\ldots$$
$$= \prod_{j=1}^{i-1} ((1 - p_j)e^{-ah_j})$$

Then the probability of the item at position i being clicked is $$F_i = p_i \prod_{j=1}^{i-1} ((1 - p_j)e^{-ah_j})$$

Note that F_i already captures that the member doesn't click on item 1 through i−1.

Now denote r_i as the reward for item i getting clicked, the scoring module 210 formulates the following optimization problem with the objective function being the expected reward of the whole visit:

$$\max_{\text{all permutation of items}} \sum_i r_i p_i \prod_{j=1}^{i-1} ((1 - p_j)e^{-ah_j})$$

s.t. constraints on layout of items

This appears to be a combinatorial problem as the scoring module 210 is optimizing over all possible permutations of the candidate items. Because of the product form of F_i, the scoring module 210 may be used to show that the optimal solution is to rank items based on $$w_i = r_i \frac{p_i}{1 - (1 - p_i)e^{-ah_i}}$$

where $(1-p\_i) e^{-ah\_i}$ is interpreted as the probability the user does not click on item i and scroll down to item i+1, under condition that item i has been seen. So the denominator is the probability that either the user clicks on item i or does not click and scrolls down to the next item. In other words, the denominator is the conditional probability that, given item i has been seen, the user does not see item i+1 and the visit terminates at item i. Therefore, $p\_i/(1-(1-p\_i)e^{-ah\_i})$ is the CTR of item i, given that a visit terminates at item i.

In other embodiments, a more generalized optimization formulation and proof of optimal ordering of content items in the feed 100 is used. In these embodiments, let x_j be the feature vector for item j (j being item ID), including display size features h and t. Let y_i be the feature vector of the item placed at the ith position (i being rank in feed). To avoid confusion, notations like x_i.h to y_i.h refer to the particular feature (size in this case) for item i and the item placed at position i.

Next, the scoring module 210 defines a permutation matrix M such that M_ij=1 if item j is placed at the ith position and 0 otherwise. In other words, y_i.*=x_j.* for M_ij=1. Also Y_i={y_1, y_2, . . . , y_i} denotes all the features for items placed up to the ith position. Similar to F_i in the previous example, F_i(Y_i) is defined as the probability of the item at position i being clicked given all features of items displayed at position 1 to i. The scoring module 210 further assumes F_i(Y_i) follows a product form:

$$F_i(Y_i) = p(y_i) \prod_{j<i} g(y_j)$$

where $p(y\_i) = Pr[\text{item at position } i \text{ is clicked} | \text{item at position } i \text{ is seen}]$ and $g(y\_i) = Pr[\text{item at position } i+1 \text{ is seen} | \text{item at position } i \text{ is seen}]$.

Here, the scoring module 210 relies on the following assumptions that:

1. Given an item at position i is seen, the event of that item getting clicked is independent with all other items, and is fully determined by the features of the item at position i itself.

2. Given an item at position i is seen, the event of a user seeing the next item at position i+1 is independent with all other items (including the item at position i+1), and is fully determined by the features of the item at position i.

This formulation does not assume the number of clicks per visit <=1. Because g( ) can include the cases when an item is clicked, then the user returns to the original feed after consuming the content from the click, and scrolls down to the next item.

Now the scoring module 210 can formulate the following optimization problem to maximize the expected reward of the whole visit:

$$\max_{\{M, y_i, t\}} \sum_i y_i \cdot rF_i(Y_i)$$

$$\text{s.t. } M_{ij} \in \{0, 1\}, \sum_j M_{ij} = 1, \sum_i M_{ij} = 1 \; \forall \, i, j$$

($M$ is a permutation matrix)

$$y_i = \sum_j M_{ij} x_j \; \forall \, i \text{ (enforce the permutation)}$$

$y_i \cdot t = 0$ (the first item is placed at top of the feed)

$y_i \cdot t = y_{i-1} \cdot t + y_{i-1} \cdot h \; \forall \, i > 1$ (items cannot overlap)

With this formulation, the optimal solution is to rank the items based on $$w_i = x_i \cdot r \frac{p(x_i)}{1 - g(x_i)}$$

$$= x_i \cdot r \frac{Pr[\text{item } i \text{ is clicked} | \text{item } i \text{ is seen}]}{Pr[\text{visit ends at item } i | \text{item } i \text{ is seen}]}$$

In an operation 408, using the solution determined by the scoring module 310, the display module 212 generates the feed 100 based on the relative scores of each of the content items. The content items are laid out from highest scoring at the top of the feed 100 with successively lower-scoring content items laid out below. The feed 100 is rendered at the user device.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
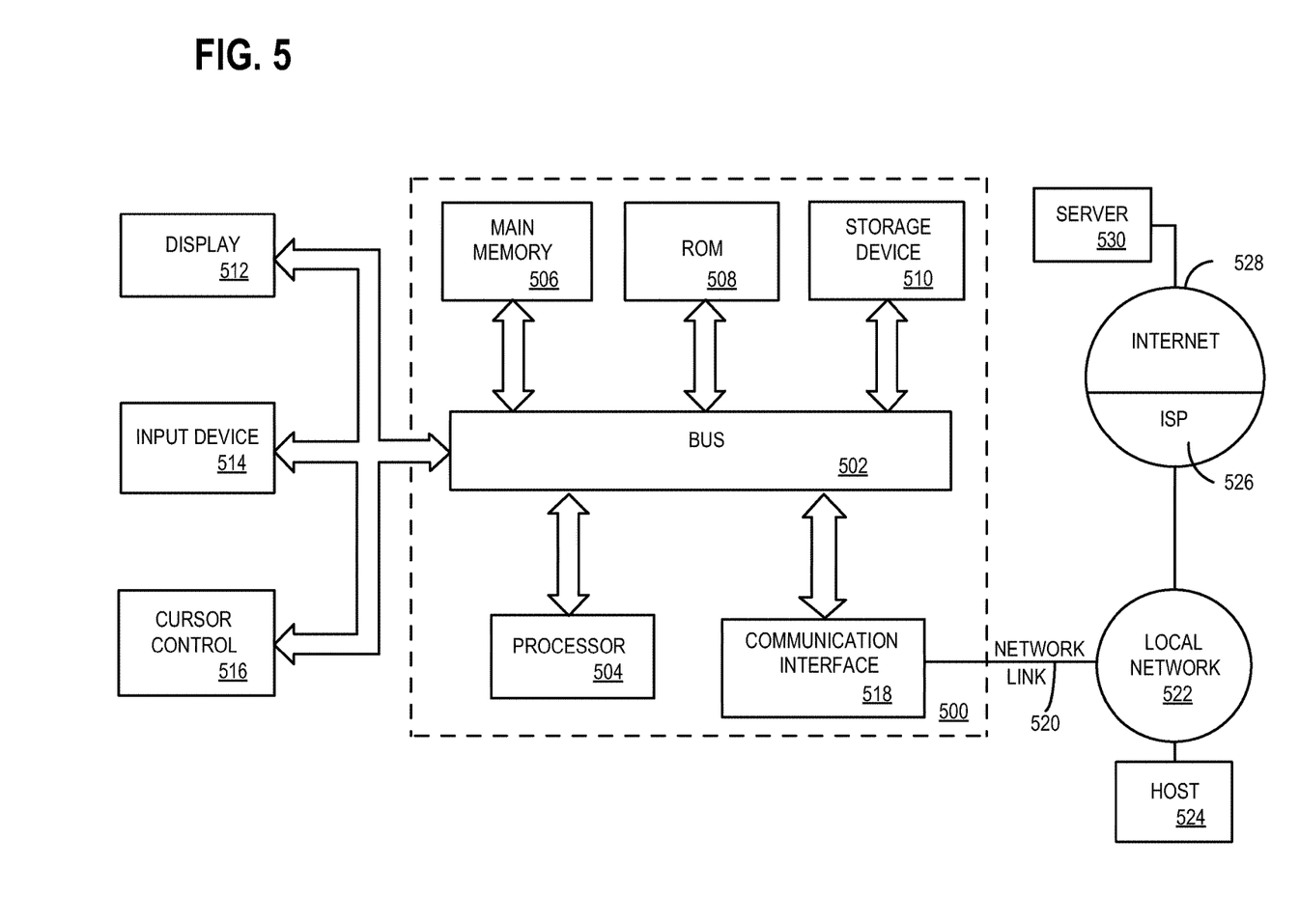
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   for each content item of a first plurality of content items:
      determining a first plurality of attributes of a first user to which said each content item has been displayed;
      associating said each content item with a label that indicates whether said each content item was scrolled or not scrolled by the first user;
      wherein a content item is scrolled by a user if the content item is displayed to the user in a first scrollable feed followed by a display to the user of one or more content items after the content item in the first scrollable feed;
   determining a second plurality of attributes of a second user;
   for each content item of a second plurality of content items to display to the second user, using a model to generate a score for said each content item based on the second plurality of attributes, wherein the model is trained, using one or more machine learning techniques, based on the first plurality of attributes and a set of labels that includes the label for each content item of the first plurality of content items;
   determining how to display, on a device of the second user, the second plurality of content items based on the score for each content item in the second plurality of content items;
   wherein determining how to display the second plurality of content items comprises ordering the second plurality of content items into a second scrollable feed;
   causing the second plurality of content items to be displayed on the device of the second user;
   wherein the method is performed by one or more computing devices.

2. The method of claim 1, further comprising, for said each content item of the first plurality of content items, associating said each content item with a second label that indicates whether said each content item was clicked or not clicked by the first user.

3. The method of claim 1, further comprising, for said each content item of the first plurality of content items, associating said each content item with a second label that indicates an amount of time said each content item was viewed by the first user.

4. The method of claim 3, further comprising modifying the amount of time said each content item was viewed by the first user based on a complexity measure of said each content item.

5. The method of claim 1, further comprising, for said each content item of the first plurality of content items, determining a third plurality of attributes of said each content item; and
   wherein training the model comprises training the model based on the third plurality of attributes of said each content item.

6. The method of claim 5, wherein the third plurality of attributes comprises an item size attribute.

7. The method of claim 1, wherein a first content item of the first plurality of content items is associated with a particular label that indicates that the first content item was scrolled if the first content item was viewed and if at least one second content item, of the first plurality of content items, that was viewable by scrolling was viewed by the first user.

8. The method of claim 1, wherein determining how to display the second plurality of content items is further based on an item size of each content item in the second plurality of content items.

9. The method of claim 1, wherein the score for each content item is based on a click through rate associated with said each content item and a first plurality of users and a number of scrolls associated with said each content item and a second plurality of users.

10. The method of claim 1, wherein the model is a first model, the score for each content item of the second plurality of content items is a first score, the method further comprising:
  for each content item in the second plurality of content items:
    using a second model that is different than the first model to generate a second score for said each content item based on the second plurality of attributes, wherein the second model is trained based on the first plurality of attributes and a second set of labels, each of which indicates whether a different content item in the first plurality of content items was clicked on by the first user;
    wherein determining how to display the second plurality of content items on the device of the second user is also based on, for each content item in the second plurality of content items, a combination of the first score and second score.

11. A system comprising:
one or more processors;
one or more non-transitory computer-readable media having instructions embodied thereon, the instructions, when executed by the one or more processors, cause:
for each content item of a first plurality of content items:
  determining a first plurality of attributes of a first user to which said each content item has been displayed;
  associating said each content item with a label that indicates whether said each content item was scrolled or not scrolled by the first user;
  wherein a content item is scrolled by a user if the content item is displayed to the user followed by a display to the user of one or more content items after the content item;
determining a second plurality of attributes of a second user;
for each content item of a second plurality of content items to display to the second user, using a model to generate a score for said each content item based on the second plurality of attributes, wherein the model is trained, using one or more machine learning techniques, based on the first plurality of attributes and a set of labels that includes the label for each content item of the first plurality of content items;
  determining how to display, on a device of the second user, the second plurality of content items based on the score for each content item in the second plurality of content items;
  causing the second plurality of content item to be displayed on the device of the second user.

12. The system of claim 11, wherein the instructions, when executed by the one or more processors, further cause, for said each content item of the first plurality of content items, associating said each content item with a second label that indicates whether said each content item was clicked or not clicked by the first user.

13. The system of claim 11, wherein the instructions, when executed by the one or more processors, further cause, for said each content item of the first plurality of content items, associating said each content item with a third label that indicates an amount of time said each content item was viewed by the first user.

14. The system of claim 13, wherein the instructions, when executed by the one or more processors, further cause modifying the amount of time said each content item was viewed by the first user based on a complexity measure of said each content item.

15. The system of claim 11, wherein the instructions, when executed by the one or more processors, further cause, for said each content item of the first plurality of content items, determining a third plurality of attributes of said each content item; and
  wherein training the model comprises training the model based on the third plurality of attributes of said each content item.

16. The system of claim 15, wherein the third plurality of attributes comprises an item size attribute.

17. The system of claim 11, wherein determining how to display the second plurality of content items comprises ordering the second plurality of content items into a scrollable feed.

18. The system of claim 11, wherein a first content item of the first plurality of content items is associated with the label that indicates that the first content item was scrolled if the first content item was viewed and if at least one second content item, of the first plurality of content items, that was viewable by scrolling was viewed by the first user.

19. The system of claim 11, wherein determining how to display the second plurality of content items is further based on an item size of each content item in the second plurality of content items.

20. The system of claim 11, wherein the score for each content item is based on a click through rate associated with said each content item and a first plurality of users and a number of scrolls associated with said each content item and a second plurality of users.

* * * * *

UNITED STATES PATENT AND TRADEMARK OFFICE
CERTIFICATE OF CORRECTION

PATENT NO. : 10,275,716 B2
APPLICATION NO. : 14/814104
DATED : April 30, 2019
INVENTOR(S) : Guanfeng Liang et al.

Page 1 of 1

It is certified that error appears in the above-identified patent and that said Letters Patent is hereby corrected as shown below:

Column 14
Claim 11: Line 5: Delete "item" and insert --items--.

Signed and Sealed this
Fourth Day of June, 2019

Andrei Iancu
*Director of the United States Patent and Trademark Office*